No. 885,039. PATENTED APR. 21, 1908.
J. E. GRAYBILL.
MACHINE FOR FORMING MOUNT TUBES.
APPLICATION FILED MAY 17, 1904.
3 SHEETS—SHEET 1.
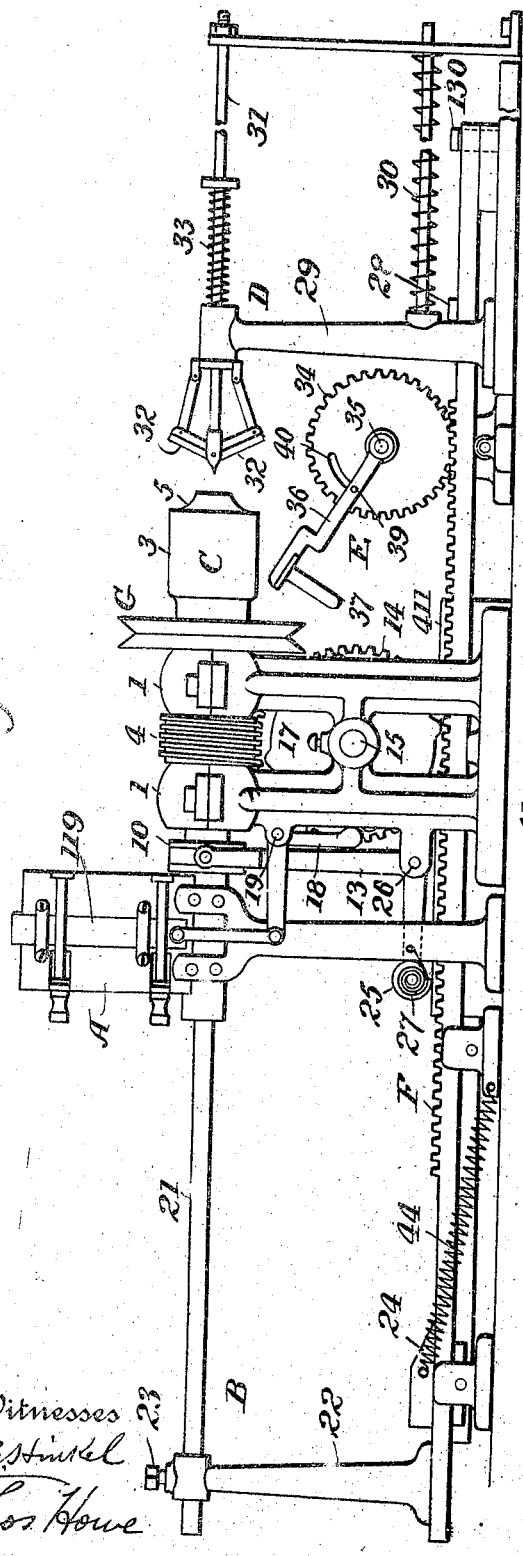
Witnesses
J. G. Stinkel
Thos Howe
Inventor
J. E. Graybill
Foster, Freeman
& Watson
Attorneys

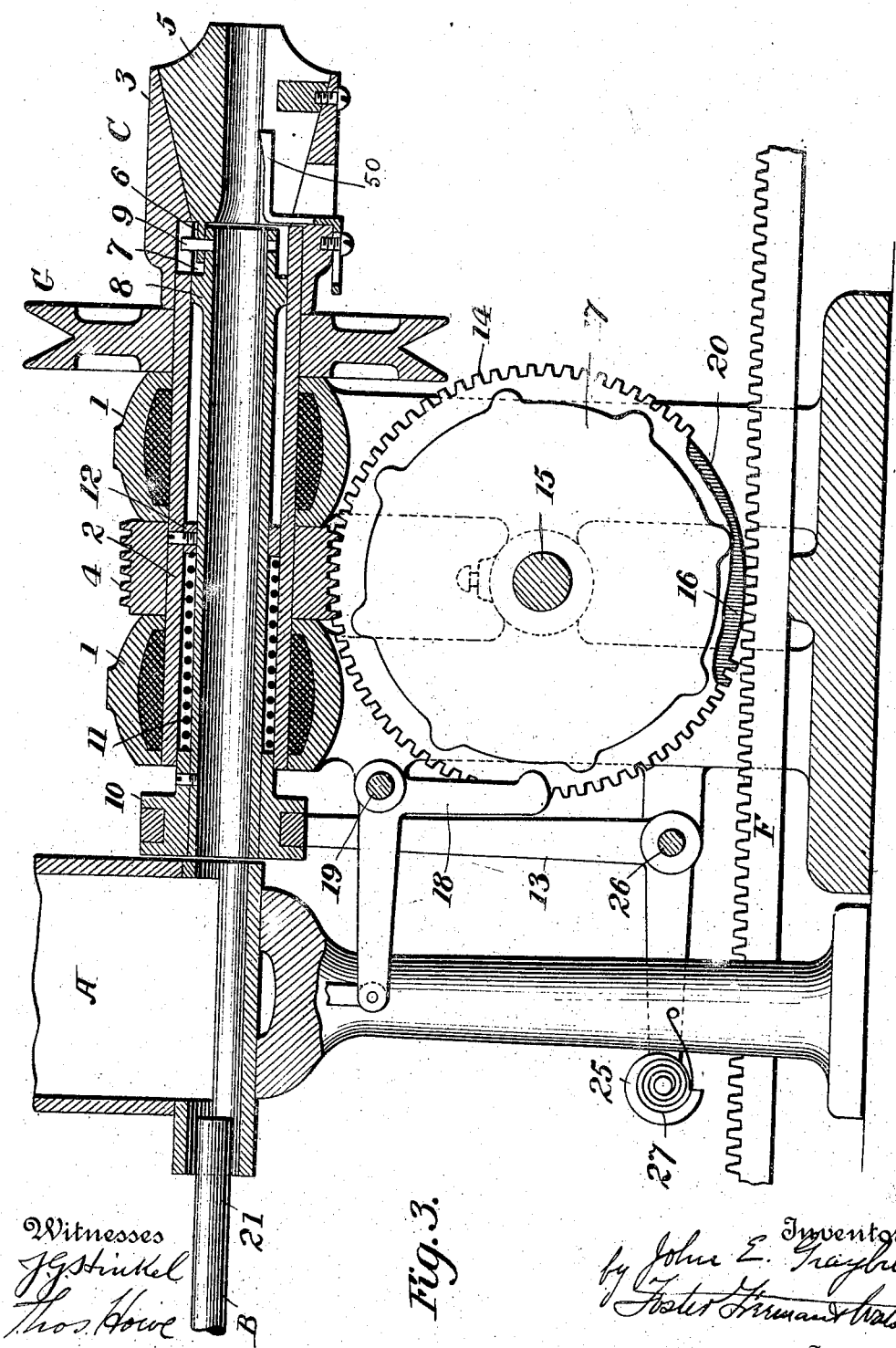

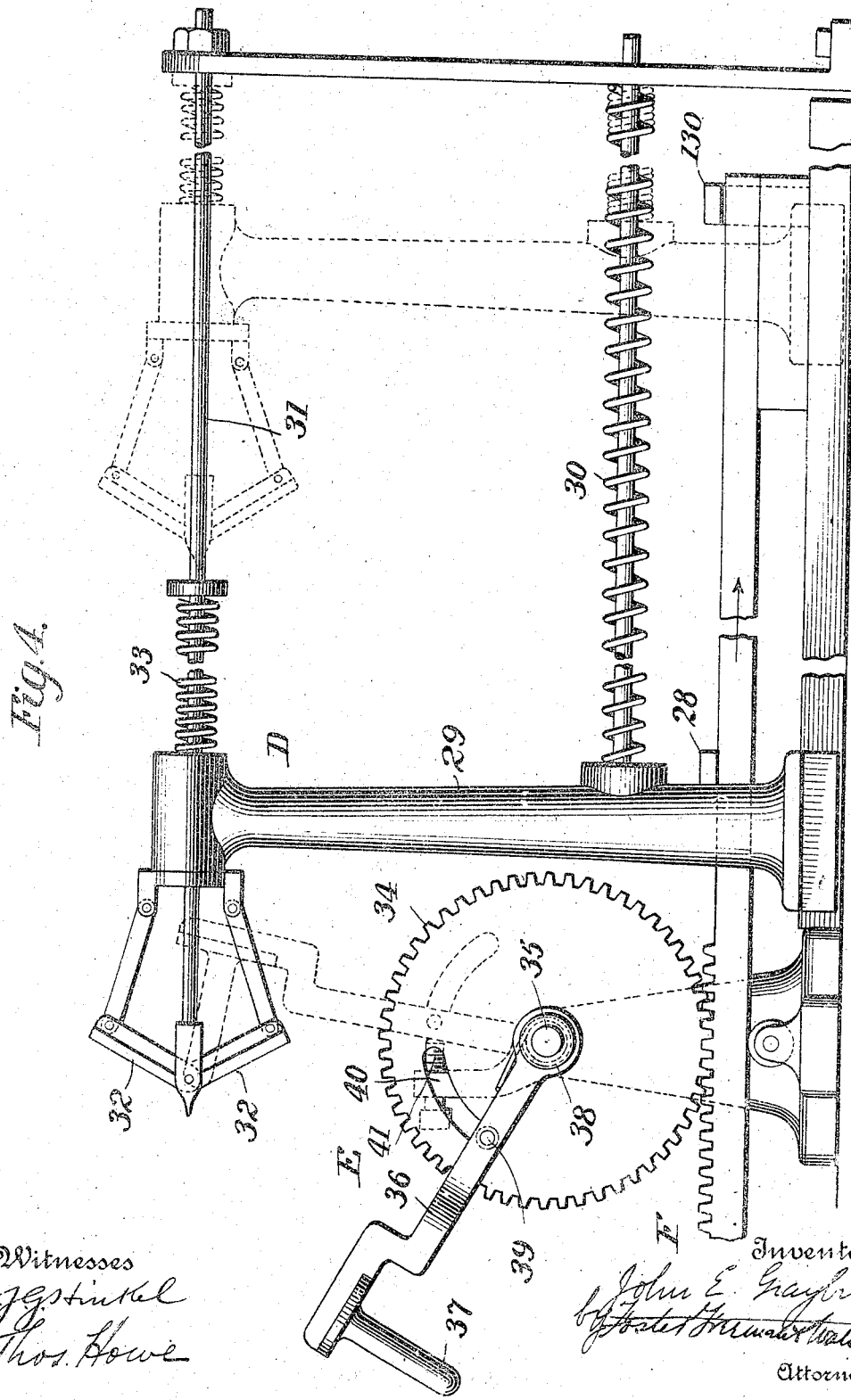

UNITED STATES PATENT OFFICE.

JOHN E. GRAYBILL, OF YORK, PENNSYLVANIA, ASSIGNOR TO GENERAL ELECTRIC COMPANY A CORPORATION OF NEW YORK.

MACHINE FOR FORMING MOUNT-TUBES.

No. 885,039.  Specification of Letters Patent.  Patented April 21, 1908.

Application filed May 17, 1904. Serial No. 208,488.

*To all whom it may concern:*

Be it known that I, JOHN E. GRAYBILL, a citizen of the United States, residing at York, in the county of York and State of Pennsylvania, have invented certain new and useful Improvements in Machines for Forming Mount-Tubes, of which the following is a specification.

This invention relates to machines for flanging mount tubes which are used in the manufacture of incandescent lamps, and has for its object the provision of improvements in the machine described in my application, Serial No. 177,801, filed October 20th, 1903, as will be hereinafter set forth.

In the accompanying drawings:—Figure 1 is a side elevation of the improved machine; Fig. 2 is a plan; Fig. 3 is an enlarged vertical section of a portion of the machine, the discharging and flanging devices and a portion of the feeding device being omitted, and Fig. 4 is a side elevation on an enlarged scale of the flanging device.

Referring to the accompanying drawings, the apparatus comprises a hopper A in which the tubes to be flanged are placed, a feeding means B for feeding the tubes into the chuck C where they are held in position to be flanged by the flanging device D.
After having been flanged, the tubes are removed from the machine by the discharging device E. The flanging, feeding and discharging means may be operated by means of a rack F which is suitably geared to the chuck C. The latter may be operated by any suitable means, as a pulley G, to which a belt may be connected.

The apparatus will now be described in detail.
Within suitable bearings, as 1, is mounted a tube 2 which at one end carries the chuck jaw guide 3 and also has fixed upon it the driving pulley G and the worm 4. Within the guide 3 are mounted the chuck jaws 5, each of which has a lug 6, extending into recesses 7 between the tube 2 and a tube 8 which is slidably mounted therein. In the end of the tube 8 are fixed pins 9 which project into holes in the lugs 6. The width of the recesses 7 between the tubes 2 and 8 is such that the lugs may move radially. An adjustable spring stop 50 prevents the tubes from being pushed backwardly in the chuck. The construction of the chuck in other respects is similar to that described in the application above referred to and reference is made to that application for details other than those which are herein described.

The tube 8 extends through the tube 2 and on its end opposite the chuck carries a circumferentially grooved collar 10 which is fixed to it. A spring 11 interposed between the collar 10 and a collar 12 fixed to the tube 2 tends to force the collar outwardly from the tube 2 and to give a corresponding motion to the tube 8 to which the collar is fixed. Within the groove upon the collar 10 projects the end of a lever 13 which may be moved as will be hereinafter described to force the collar 10 and tube 8 against the spring 11, thereby pushing the jaws 5 outwardly in the jaw guide when the centrifugal force acting upon the jaws will force them outwardly and so loosen up the chuck. Normally, however, the spring 11 will hold the jaws in gripping position.

The worm 4 mounted upon the tube 2 engages with the worm wheel 14 fixed to a rotatable shaft 15 on which are fixed the spur gear 16 and the cam 17. The spur gear engages with the longitudinal rack F and furnishes the means by which the rack is driven. It further has a blank segment 20 so that at certain times the rack may be moved independently of the gear. The cam 17 engages with the end of a lever 18 pivoted at 19 and thereby causes the reciprocation of the agitating means 119, which is otherwise constructed as described in the application before referred to.

The feeding means B comprises a feed rod 21 suitably supported upon the rack as by means of a standard 22 in which the rod may be adjusted by means of a set screw 23. The right hand end of this rod engages with the end of the bottom tube in the hopper, and as the rod moves to the right as the rack is driven by a spring 44, the tube is pushed forward into flanging position. The rack F also carries a projection 24 adapted to engage with the cam 25 mounted upon the lever 13 which is pivoted at 26, and the cam is normally held in the position shown by means of a spring 27. As the rack moves to the right, the cam 25 rolls upon the projection 24, thereby raising the cam end of the arm 13 which operates to throw the end of that lever which engages with the collar 10 to the right and thereby permits the chuck to open as before described. As the rack proceeds to the right, the cam 25 will drop off the projection 24 when the chuck will close under the influence of the spring 11. On the return motion from right to left of the rack, the left hand end of the projection 24 will strike the lower end of the cam and permit the projection to pass without moving the lever 13. The rack also carries the lateral projection 28 which is adapted to engage with the longitudinally movable pedestal 29 of the flanging means, so that as the rack nears the left hand end of its travel the flanging means will move with it against the tension of the spring 30, and conversely the spring 30 will return the flanging means to its right hand position against a fixed stop 130 as the rack returns to the right under the influence of the spring 44. This will occur when the blank segment of the gear 16 is reached.

The flanging means comprises a longitudinal member 31 slidably mounted in the pedestal 29, to which member are pivoted the lateral arms 32 which may be of nickel-steel or other suitable material and are yieldingly held in extended position by a spring 33.

Engaging with the rack F is a gear 34 mounted upon the rotatable shaft 35. An arm 36 having a projection 37 for receiving the completed mount tubes is loosely mounted on the shaft 35 and is flexibly connected with the shaft by means of a spring 38. A pin 39 fixed in the arm 36 extends into a slot 40 in the rear, while a stop 41 against which the arm 36 abuts limits the movement of the arm in a counterclockwise direction, the spring and pin and slot forming a lost motion connection between the arm 36 and the shaft 35, whereby the rack may move a short distance after the arm has reached the end of its travel. As the rack moves to the right the gear 34 will be turned through an angle suitable to bring the projection 37 into position to receive a completed tube from the chuck and then a short distance further, after the projection 37 has reached the end of its travel, to permit a tube to be pushed out of the chuck. In this case the gear 34 makes almost a complete revolution.

To prevent sudden motion of the rack and the parts connected thereto, a retarding device, such as a dash-pot 411, is connected thereto. The retarding action of the dash-pot may be regulated by means of a cock 42. To make the tubes soft and in condition to be flanged, burners 43, the flames of which are adapted to play upon the ends of tubes projecting from the chuck, may be provided.

Having described the machine, its operation may be outlined as follows:—

Tubes of the proper length having been placed in the hopper A and the parts having been positioned as shown, the rotation of the pulley G will revolve the chuck, and when the blank space 20 disengages gear 16 from the rack, the spring 44 will move the rack from its initial position toward the right. This movement of the rack will cause the feeding rod 21 to move from its initial position to push a glass tube ahead of it through the tubes 2 and 8, and just as the tube is about to enter the chuck the cam 25 will ride upon the projection 24, thereby permitting the jaws to open. During the movement of the rack up to this point the discharge arm 36 has been moving, and at this stage it will rest against the stop 41, the projection 37 being in position to receive a completed tube as it is discharged from the chuck. Further movement of the rack to the right will cause the tube to enter the chuck, so that one end projects beyond the chuck, and push a flanged tube which may be in the chuck out upon the projection 37, the lost motion connection between the arm 36 and the rack permitting this further movement while the arm remains fixed in position. During the right hand movement of the rack, the flanging means follows the projection 28, under the influence of the spring 30, until it strikes the stop 130, so that at a suitable time the flanging means is moved out of the way of the discharging means. When the said flanging means is at the end of its movement it will occupy a position as shown in the dotted lines of Fig. 4. Just as the rack reaches the end of its travel, the cam 25 will drop off the projection 24 and the chuck will be closed by the spring 11. The right hand limit of travel having been reached, which occurs before the blank segment of the gear 16 has been passed, the gear 16 returns the rack to the left. As before stated, during this movement the projection 24 has no effect upon the chuck. The projection 28 causes the flanging means to follow the rack to the end of its travel. Near the end of the left hand end of the travel of the flanging means, the member 31 enters the end of the tube to be flanged which is securely held by the chuck, and the arms 32 come against the end of the tube. The tube having become sufficiently soft under the influence of the flames from the burners 43, the small movement of the flanging means to the left after the arms 32 have come in contact with the tube, will operate to turn up a flange. During the left hand movement of the rack the arm 36 is turned in a clockwise direction, a completed tube sliding from the projection 37 into a proper receptacle. The movement to the left being completed, the parts will then occupy the position as shown in full lines in the drawings and will be in readiness for a repetition of the operation.

Without limiting myself to the precise construction and arrangement of parts shown, I claim:

1. In a machine for flanging glass tubes, the combination with bearings, of a tube rotatably mounted therein, a chuck jaw guide mounted on one end of said tube, a second tube slidably mounted within the first, chuck jaws secured to said second tube by a pin and slot connection, and means for rotating said tubes, substantially as described.

2. In a machine for flanging glass tubes, the combination with bearings, of a tube rotatably mounted therein, a chuck jaw guide mounted on one end of said tube, a second tube slidably mounted within the first, chuck jaws secured to said second tube, means for rotating said tubes, and means constantly tending to draw said jaws inwardly in said jaw guide, substantially as described.

3. In a machine for flanging glass tubes, the combination with bearings, of a tube rotatably mounted therein, a chuck jaw guide mounted on one end of said tube, a second tube slidably mounted within the first, chuck jaws secured to said second tube, means for rotating said tubes, means constantly tending to draw said jaws inwardly in said jaw guide, and means for moving said jaws outwardly in said jaw guide, substantially as described.

4. In a machine for flanging glass tubes, the combination with bearings, of a tube rotatably mounted therein, a chuck jaw guide mounted upon one end of said tube, a second tube slidably mounted within the first, chuck jaws mounted within said guides, lugs fixed to said jaws and extending into recesses between said tubes, pins fixed to said second tube and extending into holes in said lugs, the said recesses being of such width that said lugs may have sufficient movement upon said pins to permit said jaws to open, and means for rotating said tubes, chuck jaws and guide, substantially as set forth.

5. In a machine for flanging glass tubes, the combination with a rotatable tube-holding chuck, of means for rotating said chuck, means for controlling the opening and closing of said chuck, a movable rack operatively connected to said controlling means, and means for moving said rack, substantially as described.

6. In a machine for flanging glass tubes, the combination with a rotatable tube-holding chuck, of means for rotating said chuck, means for controlling the opening and closing of said chuck, a movable rack operatively connected to said controlling means, and gearing between said chuck and rack, substantially as described.

7. In a machine for flanging glass tubes, the combination with a rotatable tube-holding chuck, of means for rotating said chuck, means for controlling the opening and closing of said chuck, said controlling means comprising a lever and a cam mounted on said lever, a movable rack for operating said controlling means, a projection connected to said rack and adapted to engage with said cam, and means for moving said rack, substantially as described.

8. In a machine for flanging glass tubes, the combination with a rotatable tube-holding chuck, of means for rotating said chuck, means for controlling the opening and closing of said chuck, said controlling means comprising a lever and a rotatable cam mounted on said lever, a movable rack for operating said controlling means, a projection connected to said rack and adapted to engage with said cam, and means for moving said rack, substantially as described.

9. In a machine for flanging glass tubes, the combination with a rotatable tube-holding chuck, of means for rotating said chuck, means for controlling the opening and closing of said chuck, said controlling means comprising a lever and a cam mounted on said lever, a movable rack for operating said controlling means, a projection connected to said rack and adapted to engage with said cam, and means for moving said rack, said cam being operative upon movement of said rack in one direction and inoperative when said rack is moved in the other direction, substantially as described.

10. In a machine for flanging glass tubes, the combination of a rotatable chuck, means for rotating said chuck, feeding means for feeding the tubes into said chuck, a rack operatively connected to said feeding means, and gearing connecting said chuck and rack, substantially as described.

11. In a machine for flanging glass tubes, the combination of a rotatable chuck, means for rotating said chuck, feeding means for feeding the tubes into said chuck, a rack operatively connected to said feeding means, and means for moving said rack, substantially as described.

12. In a machine for flanging glass tubes, the combination with a rotatable tube-holding chuck, of means for rotating said chuck, a hopper for the glass tubes, means for agitating the tubes in the hopper, and a cam disk for operating said agitating means geared to said chuck, substantially as described.

13. In a machine for flanging glass tubes, the combination with holding means for holding a tube in position to be flanged, of discharge means for receiving the flanged tubes, a movable rack operatively related to said discharge means, and means for moving said rack, substantially as described.

14. In a machine for flanging glass tubes, the combination with a chuck for holding a tube in position to be flanged, of discharge means for receiving the flanged tubes, a movable rack operatively related to said discharge means, and gearing connecting said chuck and rack, substantially as set forth.

15. In a machine for flanging glass tubes, the combination with holding means for holding a tube in position to be flanged, flanging means for forming a flange upon the tubes, a movable rack operatively related to said flanging means, and means for moving said rack, substantially as set forth.

16. In a machine for flanging glass tubes, the combination with a chuck for holding a tube in position to be flanged, flanging means for forming a flange upon a tube, a movable rack operatively related to said flanging means, and gearing connecting said chuck and rack, substantially as set forth.

17. In a machine for flanging glass tubes, the combination with means for feeding the tubes in position to be flanged, a chuck for holding the tubes in flanging position, means for controlling the opening and closing of said chuck, flanging means for forming a flange upon a tube, discharge means for receiving the flanged tubes, a movable rack operatively related to all of said means, and means for moving said rack, substantially as described.

18. In a machine for flanging glass tubes, the combination with feeding means for feeding tubes into position to be flanged, a chuck for holding the tubes in position to be flanged, flanging means for forming a flange on a tube, discharge means for receiving the flanged tubes, a movable rack operatively related to all of said means, and gearing connecting said chuck and rack, substantially as described.

19. In a machine for flanging glass tubes, the combination with bearings, of a tube rotatably mounted therein, means for feeding glass tubes through the said tube, means for holding glass tubes mounted at the end of the tube, means for rotating said tube and tube holding means, a worm mounted upon said tube, a worm wheel engaging with said worm, a shaft for said worm wheel, a cam disk mounted upon said shaft, a feed hopper for the glass tubes, an agitator for said tubes, and means for operatively connecting said cam disk with said agitator, substantially as described.

20. In a machine for flanging glass tubes, the combination with means for feeding the glass tubes in position to be flanged, means for returning said feeding means to its initial position, and a retarding device connected to said feeding means, substantially as described.

21. In a machine for flanging glass tubes, the combination with bearings, of a tube rotatably mounted therein, means for feeding glass tubes through said tubes, holding means for the glass tubes mounted at the end of said tube, means for rotating said tube and tube holding means, a worm mounted upon said tube, a worm wheel engaging with said worm, a shaft for said worm wheel, a gear wheel mounted upon said shaft, and a rack engaging the said gear, substantially as set forth.

22. In a machine for flanging glass tubes, a longitudinally movable rack, means for moving said rack from its initial position, means for returning said rack to its initial position, and a retarding device connected to said rack, substantially as described.

23. In a machine for flanging glass tubes, the combination with bearings, of a tube rotatably mounted therein, means for feeding glass tubes through said tube, holding means for the glass tubes mounted at the end of said tube, means for rotating said tube and tube holding means, a worm mounted upon said tube, a worm wheel engaging with said worm, a shaft for said worm wheel, a gear wheel mounted upon said shaft, said gear having a blank segment, and a rack engaging the said gear, substantially as described.

24. In a machine for flanging glass tubes, the combination with a rotatable shaft, of means for rotating said shaft, means for discharging flanged tubes from the machine, and a lost motion connection between said shaft and said discharging means, substantially as described.

25. In a machine for flanging glass tubes, the combination with a rotatable shaft, of means for rotating said shaft, rotatable means for discharging flanged tubes from the machine, and a lost motion connection between said shaft and said discharging means, substantially as described.

26. In a machine for flanging glass tubes, the combination with a rotatable shaft, of means for rotating said shaft, a disk fixed upon said shaft, an arm for receiving the completed tubes loosely mounted upon said shaft, a spring connecting said arm and shaft, a pin upon said arm projecting into a slot in said disk, and a stop for said arm, substantially as described.

In testimony whereof I have signed my name to this specification in the presence of two subscribing witnesses.

JOHN E. GRAYBILL.

Witnesses:
 ELLEN M. WELLENSIEK,
 RICH. E. COCHRAN.